Patented June 5, 1928.

1,672,790

UNITED STATES PATENT OFFICE.

FRANK N. STEIGLEDER, OF PITTSBURGH, PENNSYLVANIA.

METHOD AND COMPOSITION FOR REMOVING DRAWING INK.

No Drawing.      Application filed July 20, 1925. Serial No. 44,908.

The present invention relates to an eradicator for drawing ink, also known as carbon ink or india ink, and to an improvement in removing drawing ink from drawings, particularly drawings on drawing paper or rice paper or vellum, and further embraces a filler which may advantageously be used on the drawing paper after the ink has been removed, in some cases.

For making up the ink eradicator, I may use equal volumes of a solution of sodium hypochlorite, and a solution of potassium hypochlorite. These two liquids are put together and shaken well for about one minute, then I add an amount of chlorine water ($H_2O + Cl$) equal to the combined amounts of the above solutions of sodium hypochlorite and potassium hypochlorite by volume. The above proportion is substantially as follows: 25% by volume of sodium hypochlorite solution plus 25% by volume of potassium hypochlorite solution plus 50% of chlorine water by volume. This makes a total of 100% and this proportion as above outlined, should be maintained, for preparing or making up any quantity of my ink eradicator solution or composition.

The sodium hypochlorite solution, which can be purchased on the market, varies more or less in concentration and I have found that a solution, alkaline in character and having a specific gravity of 1.12 and containing about 3% of available chlorine gives satisfactory results.

The potassium hypochlorite solution which can be purchased on the market under the name of Javelle water, varies more or less in concentration, and I have found that a solution containing about 2.3 to 3.3% (preferably about 2.5) of available chlorine gives satisfactory results.

The chlorine water which can be purchased on the market, likewise varies more or less in concentration, and this may be water which is substantially saturated with chlorine gas at ordinary atmospheric temperature. It is not necessary however that the water be absolutely saturated but may be two thirds or three quarters saturated. The concentration of the chlorine water as above stated can vary more or less, but I prefer to use a chlorine water containing from about 0.25 up to 0.4 grams of chlorine per 100 mils.

The above solution is then ready for use, and it is most conveniently kept in brown bottles (in order to prevent excessive action of sun-light upon the material), and I find it most advisable to employ a rubber stopper having a medicine dropper in the same, with which to apply the solution.

The above solution, composition, or ink eradicator works exceedingly well on all classes of drawing papers, rice papers, and vellum papers, and also works very quickly. After removing the part desired, the draftsman can ink in any part of a line, letter or figure which was unintentionally removed by the ink eradicator, while he is replacing the changed or altered lines, letters, and figures.

In a modification of the process, designed to have a liquid which works a little slower than the regular ink eradicator above described, instead of using the above formula, I use a modification of said formula as follows:

For making up the modified formula I may use equal volumes of a solution of sodium hypochlorite, and chlorine water ($H_2O + Cl$). These two liquids are put together and shaken well for about one minute. To one-eighth of a pint of the above, I add one level teaspoonful of dry sodium chloride, which should be chemically pure. Ordinary table salt is not so well adapted for this purpose as chemically pure sodium chloride, for the reason that the table salt contains, or is likely to contain, more or less iodine, which would be liberated by the action of the chlorine on the sodium chloride. Therefore, I do not think it advisable to use table salt at all, and prefer to always use the chemically pure sodium chloride. After the sodium chloride is added to the above solution of chlorine water and sodium hypochlorite, the container should be well shaken so that the above liquids are well mixed and the sodium chloride dissolves. To the above mixture of one-eighth of a pint of said solution, I add an equal volume of carbonated water. The proportion is then as follows, approximately: one-sixteenth of a pint of solution of sodium hypochlorite plus one-sixteenth of a pint of chlorine water, plus one-eighth of a pint of carbonated water. The carbonated water, which can be purchased on the market, is a solution of carbon dioxide in water, preferably saturated at ordinary room temperature. It is often advisable to add a further amount of sodium hypochlorite solution, say about 20% or 25% of the latter after the above ingredients have been mixed. This is only necessary when the sodium hypochlorite and chlorine water above mentioned have become somewhat weakened by the action of air and light from the full strength as they are first purchased.

This formula is only used on rare occasions where time makes no difference and the drawing is the chief concern. However, on all regular work where time is of primary importance, I prefer to use the first formula given. This formula makes a solution or composition known as ink eradicator, which works very quickly on all classes of drawing papers, rice papers, and vellum papers.

This liquid ink eradicator is not ordinarily recommended for use on tracing cloth; although it will remove the ink since it leaves a white spot on the tracing cloth. It is accordingly not so suitable for use on tracing cloth.

For applying the eradicator, the drawing is first tacked down upon the drawing board, as if ordinary drawing work were to be done. The drawing board should then be adjusted to a level position so that the liquid ink eradicator will not run all over the surface of the drawing. I then slide a clean white blotter under the portion of the drawing which is to be removed, and have another clean white blotter handy for subsequent use. I then apply a drop or a few drops of the liquid from the medicine dropper upon the spot where it is desired to remove the ink, and I then brush the liquid into the ink gently with a relatively stiff bristle brush, which should be white and free from color. After brushing for a short time, it will be found that the liquid has thoroughly mixed with the ink, and then with a clean blotter the liquid is removed. Even for removing heavy blots of drawing ink, the brushing may require only three to five minutes, in order to cause the liquid to mix thoroughly with the ink, upon which the pigment will largely float. The steps of applying liquid, brushing it in, and blotting may be repeated several times if necessary, until the ink is entirely removed.

My theory of the operation of this ink eradicator is that the solution attacks the "binder" in the ink, and thereby sets the carbon, or lamp black free, so that the carbon floats upon and in the liquid and is taken up by the blotter. The presence of salt (sodium chloride) when used in the modified formula above referred to, prevents the solution from unduly softening the paper.

In all cases where I refer herein to the use of blotters, white blotters should be employed and not colored ones. I preferably use a relatively soft blotter made from cotton fibre. The blotters on the market under the name "Sterling" have given very satisfactory results. I have used my ink eradicator as above described on many of the common drawing inks, for example "Higgins" or "Carter's", and many of the other so called "india inks" with satisfactory results. The present invention is not concerned with the removal of ordinary writing fluids which are well known to consist of tannic acid compounds of iron.

I call attention to the fact that this compound does not in any way injure ordinary drawing paper, rice paper, or vellum paper, or even tracing cloth, or any kind of drawing papers such as are commonly used for making ink drawings with india ink.

After removing ink from drawings and before the paper is entirely dry, I take a clean white blotter and slide it under the wet spot, and I take another clean white blotter and lay on top of the wet spot, and I rub with the fingers, creating a friction on the blotter which will dry the paper quickly. However, in some cases where the paper has become somewhat roughened, and when it is desired to do further drawing on the sheet after removal of the ink, it is advisable to apply a filler to the paper; this filler may consist of a solution of pyroxylin, in a solvent, preferably ether and alcohol. The filler which I have found to give very satisfactory results, is made by diluting ordinary collodion with about 25% of volume of ether. Ordinary collodion is rather too thick and viscous to apply readily, but when diluted as above indicated, it can be readily applied to the paper by means of a camel's hair brush. The drawing is then allowed to stand until the paper is thoroughly dry (say 1 to 2 minutes) after which any additional drawing can be performed. Obviously only a very thin coating of the diluted collodion will be applied to the paper.

I also use this ink eradicator for other purposes than removing ink from drawings, as follows:

(a) Making white lines or white figures or letters on regular blueprints or Vandykes or negative photostats.

(b) Removing lines, letters and figures from blue line prints, brown line prints, or from positive photostats, (the lines etc. being respectively blue, brown or black).

In all these cases, I apply the liquid with a ruling pen or lettering pen where I want to make lines, letters, and figures, and I do not blot them as we do with ink but simply let the liquid soak in and dry naturally; occasionally the liquid has to be applied a second time to make the lines, letters and figures real white.

Where I use this liquid to remove black lines, brown lines, and blue lines, we simply apply the liquid with the medicine dropper which is attached to the rubber cork of the bottle containing the liquid. I simply apply the liquid by dropping it from the medicine dropper onto the lines, letters and figures, to be removed, and let it soak in, occasionally repeating the process once or twice.

I call attention to the fact that while I have described particular proportions, and particular substances, the invention is capable of considerable variation within the scope of the appended claims.

I claim:

1. An ink eradicator comprising the reaction products of alkali metal hypochlorite, chlorine water, and carbon dioxide in water.

2. An ink eradicator comprising a solution of sodium hypochlorite having about three per cent available chlorine, potassium hypochlorite solution about two and five tenths per cent, and chlorine water over two thirds saturated.

3. An ink eradicator containing the reaction products of sodium hypochlorite, chlorine, and carbon dioxide in water.

4. A solution suitable for removing drawing ink containing alkaline metal hypochlorite, sodium chloride, carbonic acid, free chlorine and water.

5. An ink eradicator comprising a solution of an alkali metal hypochlorite and chlorine water, the hypochlorite solution having about three percent available chlorine, and the chlorine water being over two thirds saturated.

6. The process of removing drawing ink consisting in applying a solution containing an alkali metal hypochlorite and chlorine water, brushing the treated parts to thoroughly impregnate the ink, and applying a blotter with a rubbing action.

7. A process for removing india ink from a drawing consisting in applying to selected portions of the ink, a solution of an alkali metal hypochlorite mixed with a 3% solution of chlorine and water, thoroughly impregnating by a brushing action to lift the pigment, applying a blotter and rubbing briskly the surface of the latter.

In testimony whereof I affix my signature.

FRANK N. STEIGLEDER.